US008644592B2

(12) United States Patent
De Marchi et al.

(10) Patent No.: US 8,644,592 B2
(45) Date of Patent: *Feb. 4, 2014

(54) METHOD AND SYSTEM FOR DETERMINING THE POSITION OF A FLUID DISCHARGE IN AN UNDERWATER ENVIRONMENT

(75) Inventors: Eliana De Marchi, Salzano (IT); Paolo Ferrara, Milan (IT); Roberto Ferrario, Padua (IT); Roberto Finotello, Venezia Mestre (IT)

(73) Assignee: ENI S.p.A., Rome (IT)

( * ) Notice: Subject to any disclaimer, the term of this patent is extended or adjusted under 35 U.S.C. 154(b) by 217 days.

This patent is subject to a terminal disclaimer.

(21) Appl. No.: 12/936,583

(22) PCT Filed: Apr. 6, 2009

(86) PCT No.: PCT/IB2009/005206
§ 371 (c)(1),
(2), (4) Date: Dec. 16, 2010

(87) PCT Pub. No.: WO2009/125280
PCT Pub. Date: Oct. 15, 2009

(65) Prior Publication Data
US 2011/0110582 A1    May 12, 2011

(30) Foreign Application Priority Data

Apr. 7, 2008 (IT) ............... MI2008A0604

(51) Int. Cl.
*G06K 9/00* (2006.01)
(52) U.S. Cl.
USPC ............. 382/154; 701/21; 359/228; 359/376; 359/458; 359/462; 405/158; 166/92.1; 166/97.1; 166/75.13; 166/96.1; 166/339

(58) Field of Classification Search
USPC .............. 382/154; 348/42, 51; 359/228, 376, 359/458, 462; 405/154.1, 158, 184.4; 367/5, 20, 21; 166/92.1, 97.1, 75.13, 166/77.1, 93.1, 96.1, 339, 337, 343, 250.01, 166/250.08
See application file for complete search history.

(56) References Cited

U.S. PATENT DOCUMENTS

| 8,136,597 B2 * | 3/2012 | Calderoni et al. ............ 166/343 |
| 2004/0233784 A1 * | 11/2004 | Bernard ........................ 367/99 |
| 2005/0213649 A1 * | 9/2005 | Green et al. .................. 375/222 |
| 2006/0050610 A1 * | 3/2006 | Harvey et al. .................... 367/5 |
| 2006/0280030 A1 * | 12/2006 | Makris et al. ................... 367/11 |

OTHER PUBLICATIONS

Negahdaripour, S.; , "Epipolar geometry of opti-acoustic stereo imaging," Oceans 2005—Europe , vol. 1, no., pp. 407-412 vol. 1, Jun. 20-23, 2005.*

(Continued)

*Primary Examiner* — Stephen R Koziol
*Assistant Examiner* — Shaghayegh Azima
(74) *Attorney, Agent, or Firm* — Oblon, Spivak, McClelland, Maier & Neustadt, L.L.P.

(57) ABSTRACT

A method for determining a position of a fluid discharge in an underwater environment, the method including: collecting data relating to an underwater area through at least two acoustic sensors; filtering and processing the data collected to identify the presence of the discharged fluid and the underwater area involved; forming a single stereoscopic image by combining the plurality of single three-dimensional images; and estimating the position of the fluid discharge on the basis of the stereoscopic image thus obtained.

7 Claims, 2 Drawing Sheets

(56) References Cited

OTHER PUBLICATIONS

Negahdaripour, S.; Firoozfam, P.; Sabzmeydani, P.; , "On processing and registration of forward-scan acoustic video imagery," Computer and Robot Vision, 2005. Proceedings. The 2nd Canadian Conference on , vol., no., pp. 452-459, May 9-11, 2005.*

Negahdaripour, S.; Sekkati, H.; Pirsiavash, H.; , "Opti-Acoustic Stereo Imaging, System Calibration and 3-D Reconstruction," Computer Vision and Pattern Recognition, 2007. CVPR '07. IEEE Conference on , vol., no., pp. 1-8, Jun. 17-22, 2007.*

Negahdaripour, S.; , "Epipolar Geometry of Opti-Acoustic Stereo Imaging," Pattern Analysis and Machine Intelligence, IEEE Transactions on , vol. 29, No. 10, pp. 1776-1788, Oct. 2007.*

International Search Report issued Sep. 2, 2009 in PCT/IB09/005206 filed Apr. 6, 2009.

Negahdaripour, S., "Epipolar Geometry of Opti-Acoustic Stereo Imaging", Oceans—Europe 2005, pp. 407-412 (Jun. 20, 2005) XP010838522.

Sun, N. et al., " Sonar Images Classification of Seabed Physiognomy Based on the Information Fusion Methods", 2008 Congress on Image and Signal Processing, pp. 813-819 (May 27, 2008) XP 031286809.

Sun , N. et al., "3D Reconstruction of Seafloor From Sonar Images Based on the Multi-Sensor Method", Proceedings of IEEE International Conference on Multisensor Fusion and Integration for Intelligent Systems, pp. 573-577 (Aug. 20, 2008) XP 031346211.

* cited by examiner

METHOD AND SYSTEM FOR DETERMINING THE POSITION OF A FLUID DISCHARGE IN AN UNDERWATER ENVIRONMENT

FIELD

The present invention relates to a method and system for determining the position of a fluid discharge in an underwater environment.

In monitoring and maintenance applications and emergency interventions of underwater plants, it is often necessary to identify and know the position of flows of fluids, such as for example gas, oil or compounds, of both the single-phase and multiphase type.

BACKGROUND

In particular, in the oil industry, this information is fundamental in case of losses from pipelines or fluid discharges from wells for being able to effect interventions for operations on the flow, also remote automated.

In these applications, however, there is often the presence of high pressure flow discharges, thus making it necessary to effect measurements at a significant minimum safety distance in order to guarantee the safety of the measuring equipment.

Considering, in addition, the poor visibility available in an underwater environment, it is impossible to effect the measurements at these safety distances with optical sensors such as cameras or lasers.

The use of an acoustic sensor is therefore currently known, such as for example a sonar, transported by underwater vehicles close to the area to be inspected in particular for identifying leakages along a pipe.

Although the use of an acoustic sensor has proved to be valid in recognizing the presence of single-phase and multiphase flows, either gas- or oil-based, this technique however is not capable of providing a sufficient degree of accuracy with respect to determining the position of the flow discharge.

In particular, as the overall measurement error is proportional to the measurement distance, the measurements effected at minimum safety distances provide an error which does not allow an automated intervention.

OBJECTS

An objective of the present invention is to provide a method which is capable of determining the position of a fluid discharge in an underwater environment with sufficient precision also when the measurement is effected at a great measurement distance.

A further objective of the present invention is to create a method for determining the position of a fluid discharge in an underwater environment which allows remote automated interventions to be effected on said flow.

Another objective of the present invention is to provide a system for determining the position of a fluid discharge in an underwater environment which implements said method.

These and other objectives according to the present invention are achieved by providing a method and system for determining the position of a fluid discharge in an underwater environment as specified in the independent claims.

Further characteristics of the method and system for determining the position of a fluid discharge in an underwater environment are object of the dependent claims.

BRIEF DESCRIPTION OF THE DRAWINGS

The characteristics and advantages of a method and system for determining the position of a fluid discharge in an underwater environment according to the present invention will appear more evident from the following illustrative and non-limiting description, referring to the enclosed schematic drawings in which.

DESCRIPTION OF PREFERRED EMBODIMENTS

Figure 1:
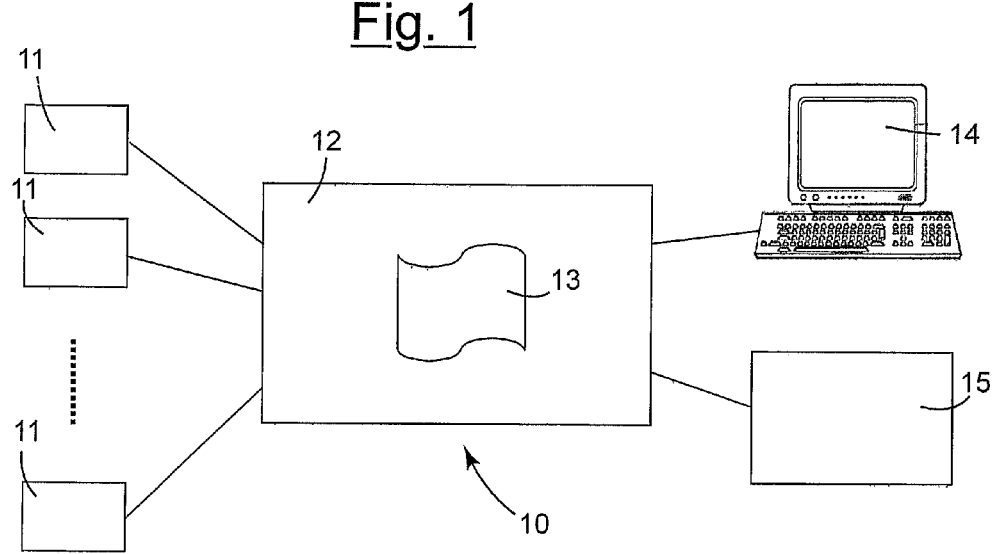
FIG. 1 is a schematic representation of the system for determining the position of a fluid discharge in an underwater environment according to the present invention.
Figure 3:
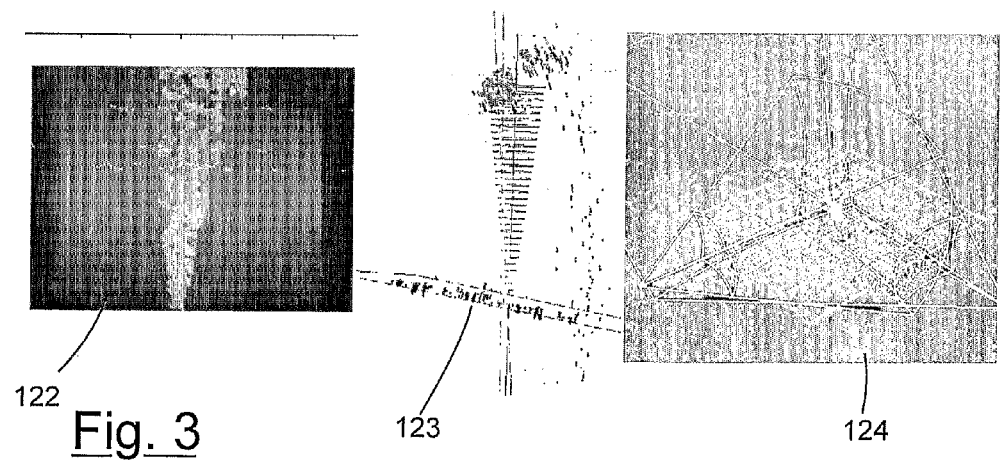
FIG. 3 is a graphic representation of the intermediate results obtained following some of the data processing phases by means of the method according to the present invention.
Figure 2:
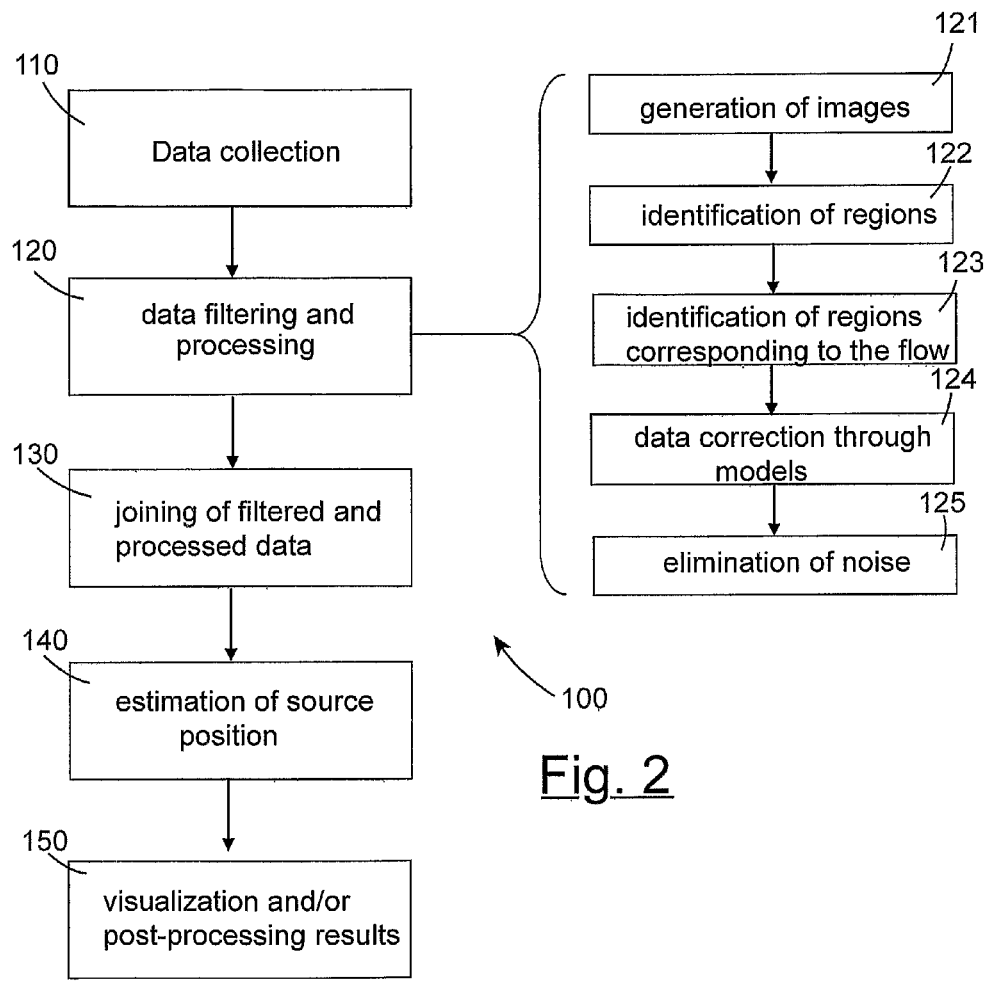
FIG. 2 is a block scheme of the method for determining the position of a fluid discharge in an underwater environment according to the present invention.

With reference to the figures, these show a system for determining the position of a fluid discharge in an underwater environment, indicated as a whole with 10.

Said system 10 comprises a detection unit consisting of at least two acoustic sensors 11 capable of determining the presence of obstacles and the distance from the same through the emission of acoustic signal and the subsequent analysis of the eco revealed.

The sensors 11 are constrained so as to maintain a reciprocal fixed or in any case known positioning and be oriented towards a common detection area.

Said sensors 11 are preferably integrally constrained to a fixed supporting structure or each to an underwater vehicle which maintains its position and orientation.

The sensors 11 are connected to a processing unit 12 which comprises software means 13 through which the data revealed are processed in order to identify the position of a possible fluid discharge in an underwater environment.

For this purpose, the software means 13 implement the method for determining the position of a fluid discharge in an underwater environment according to the present invention described further on.

The processing unit 12 is also connected through a specific interface to the display means 14 and/or at least a second processing unit 15 in order to provide the data obtained for further processing, for example should they be necessary for effecting automated underwater operations.

The functioning of the system for determining the position of a fluid discharge in an underwater environment according to the present invention is the following.

In a first phase 110, the data are collected in real time through the at least two acoustic sensors 11. The data is then actually processed.

The data coming from the two sensors are initially filtered to eliminate the overlying noise (phase 120).

For this purpose, bidimensional images are first created, only comprising the points revealed by the sensors 11 with a greater intensity (phases 121).

These images are subsequently divided into detached regions through a process called segmentation which associates the homogeneous and contiguous portions with each other. A map is thus formed which graphically represents a plurality of regions thus identified (phase 122) in order to isolate the representation areas of the fluid flow (phase 123).

This phase 123 is obtained by applying standard bidimensional algorithms to the image revealed by the sensors 11, such as for example growth algorithms of regions in connected components of the known type, and correcting the result obtained through geometrical information known a priori, such as for example the distance of the single sensors 11 with respect to structures revealed by the same and the substantially vertical direction of the axis of the fluid flow.

So-called "Model Fitting" algorithms are applied to the regions thus identified in the image, which adapt these regions to geometries characteristic of the flow of fluids. In this way, it is possible to isolate and eliminate the points in the image which, as not belonging to these characteristic geometries, are recognized as non-characteristic of the image of the fluid flow (phase 124).

For this purpose, the regions are initially projected in three-dimensional images and the main inertial axes are calculated to determine the geometrical form of the regions identified.

In particular, the main axis of the flow itself is identified for the regions characteristic of the fluid flow.

In order to eliminate incorrect information, due for example to acoustic noise and false echoes, through statistic filtering, a specific filtering algorithm is subsequently applied, such as the algorithm called Random Sample Consensus (RanSaC) known in literature (phase 125).

For each sensor 11 a processed three-dimensional image is thus obtained to identify, on the same image, the form of the fluid flow. These however are still single isolated images.

As these three-dimensional isolated images are acquired according to stereoscopy theories for locating the fluid flow from different view points, whose reciprocal position is known, they must be subsequently joined to form a single stereoscopic image (phase 130).

For this purpose, an algorithm for joining the isolated images is applied, using the information on the reciprocal position of the sensors 11. A Euclidian point-to-point transformation of the points forming the surface of the fluid flow in the image, is preferably used.

In this way, a single stereoscopic three-dimensional image of the surface of the fluid flow is obtained, with respect to a reference system situated on one of the at least two sensors 11, with greater information on the curvature of said surface.

Finally an evaluation of the geometrical form and dimensions of the flow of fluid present in the overall three-dimensional image obtained is effected together with an estimation of the coordinates of the point of origin of the same (phase 140).

For this purpose, intersection algorithms of the planes and vertical axis are applied to the stereoscopic image obtained, to estimate the coordinates of the discharge point of the fluid flow. In particular, the intersection of a plane close to the outlet surface of the fluid flow, such as for example the sea bottom, is estimated together with the main axis of the fluid flow identified in the previous processing phases.

Furthermore, the coordinates of the flow source thus determined and the three-dimensional representation of the flow are provided for their visualization or for use in possible subsequent processings (phase 150).

The Applicant effected a plurality of tests on the system 10 for determining the position of a fluid discharge in an underwater environment thus obtained, observing great precision in determining the position of the flow source even when effecting the measurement at great distances.

Figure 4:
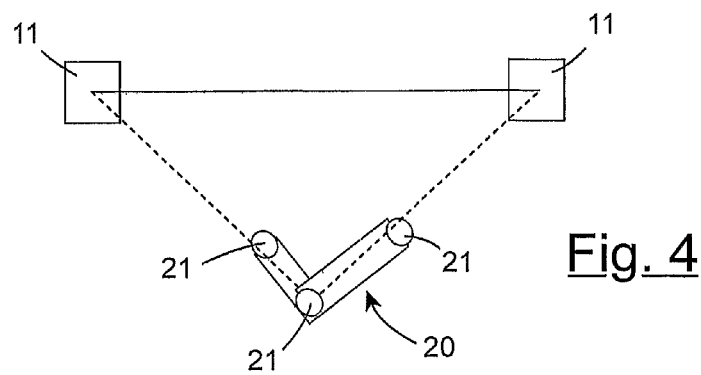
FIG. 4 is a schematic representation of a test configuration used for validating the invention.

For this purpose, a prototype was produced using two acoustic sensors 11 resting on the sea floor according to the scheme of FIG. 4.

The two sensors 11 were maintained at a distance of about 10 m from a structure 20 for the generation of flows, substantially corresponding to the minimum safety distances which must be respected during underwater interventions in the presence of fluid discharges.

Said structure 20, comprising a plurality of nozzles for the generation of fluid flows upon manual command, also rested on the sea floor.

The structure 20 also contained various balls and semi-balls 21 for calibrating the instruments, for measuring the effective position of the two sensors 11 with respect to the same structure 20.

The nozzles of the structure 20 were connected to a pressurized gas reserve and various tests were effected feeding one nozzle at a time with pressurized gas.

It was observed that the prototype of the system 10 for determining the position of a fluid discharge in an underwater environment according to the invention is capable of determining the position of the active nozzle with a margin of error lower than 10 cm approximately, i.e. with an accuracy equal to about 1% of the measurement distance.

The characteristics of the device object of the present invention, as also the related advantages, are evident from the above description.

In particular, the method for determining the position of a fluid discharge in an underwater environment according to the present invention allows the position of underwater flows to be identified guaranteeing an extremely reduced margin of error also when the measurements are effected from great safety distances, for example in the order of tens of metres.

It is therefore possible to effect automated underwater interventions based on the measurement results provided by the system according to the invention.

Finally, the system thus conceived can obviously undergo numerous modifications and variants, all included in the invention; furthermore, all the details can be substituted by technically equivalent elements.

In practice, the materials used, as also the dimensions, can vary according to technical requirements.

The invention claimed is:

1. A method for determining a position of a fluid discharge in an underwater environment, the method comprising:
   a) collecting data relating to an underwater area through at least two acoustic sensors;
   b) filtering and processing the data collected so as to obtain a plurality of single three-dimensional images of the underwater area analyzed;
   c) forming a single stereoscopic image by combining the plurality of single three-dimensional images; and
   d) estimating the position of the fluid discharge on the basis of the formed single stereoscopic image;
   wherein, for each combination of data collected by the acoustic sensors, the filtering and processing comprises:
   b1) generating a bidimensional image only comprising points revealed having a greater intensity;
   b2) dividing the bidimensional image into detached regions by combining homogeneous and contiguous portions of the bidimensional image;
   b3) identifying among the regions those regions representing a flow of the fluid discharge;
   b4) projecting the regions identified in a three-dimensional image and determining a geometrical form of the three-dimensional image;
   b5) reducing acoustic noise contained in the three-dimensional image through statistic filtering.

2. The method for determining the position of a fluid discharge in an underwater environment according to claim 1, wherein the identifying the regions representing the flow of the fluid discharge comprises applying algorithms for bidimensional images to the image revealed by the acoustic sensors and correcting a result obtained through constant and known data.

3. The method for determining the position of a fluid discharge in an underwater environment according to claim 1, wherein the determining the geometrical form of the regions identified comprises applying to the three-dimensional images an adapting algorithm to characteristic geometries eliminating points identified as not belonging to the characteristic geometries.

4. The method for determining the position of a fluid discharge in an underwater environment according to claim 3, wherein the determining the geometrical form of the regions identified comprises calculating main inertial axes of the regions and a main axis of the flow of fluid.

5. A method for determining a position of a fluid discharge in an underwater environment, the method comprising:
   a) collecting data relating to an underwater area through at least two acoustic sensors;
   b) filtering and processing the data collected so as to obtain a plurality of single three-dimensional images of the underwater area analyzed;
   c) forming a single stereoscopic image by combining the plurality of single three-dimensional images; and
   d) estimating the position of the fluid discharge on the basis of the formed single stereoscopic image;
   wherein the forming a single stereoscopic image comprises applying a Euclidian point-to-point transformation of points forming a surface of the fluid flow of the single three-dimensional images on the basis of the reciprocal position of the at least two acoustic sensors.

6. The method for determining the position of a fluid discharge in an underwater environment according to claim 4, wherein the estimating the position of a fluid discharge comprises intersecting a plane that approximates an outlet surface of the fluid flow with a main axis of the fluid flow.

7. A system for determining a position of a fluid discharge in an underwater environment, comprising:
   a processing unit to implement a method for determining the position of a fluid discharge in an underwater environment according to claim 1;
   wherein the processing unit is connected to at least the two acoustic sensors arranged in a reciprocal position and with a fixed reciprocal orientation.

* * * * *